(12) United States Patent
Hayashida

(10) Patent No.: US 7,078,125 B2
(45) Date of Patent: Jul. 18, 2006

(54) APPARATUS

(75) Inventor: Takayuki Hayashida, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 405 days.

(21) Appl. No.: 10/730,290

(22) Filed: Dec. 9, 2003

(65) Prior Publication Data

US 2004/0241538 A1    Dec. 2, 2004

(30) Foreign Application Priority Data

Dec. 10, 2002    (JP) ............................. 2002-358491

(51) Int. Cl.
    *H01M 2/02*   (2006.01)
    *H01M 4/00*   (2006.01)
    *H01M 2/26*   (2006.01)
(52) U.S. Cl. .......................................... 429/178; 66/121
(58) Field of Classification Search ................. 429/178, 429/100, 123, 97, 121, 66
    See application file for complete search history.

(56) References Cited

FOREIGN PATENT DOCUMENTS

JP    2000-021359 A    1/2000

*Primary Examiner*—Patrick Joseph Ryan
*Assistant Examiner*—Thomas H. Parsons
(74) *Attorney, Agent, or Firm*—Sughrue Mion, PLLC

(57) ABSTRACT

To provide an apparatus equipped with a battery terminal which ensures sufficient discharge capacity with reduced variations in contact resistance between electrodes of the battery and electrode armatures of the apparatus. An apparatus which is supplied with electric power from a battery, including a battery terminal which comes into contact with an electrode of the battery contained in a battery compartment and draws electric power from the battery, wherein the battery terminal is made of a conductive and elastic plate member bent to make a circuit, with both its ends juxtaposed to each other, has contacts which come into contact at both the ends with the battery electrode, and has a pair of claws which are formed at positions closer to the center of the plate member than are both the ends to pinch the battery by deflection of the plate member.

4 Claims, 5 Drawing Sheets

APPARATUS

BACKGROUND OF THE INVENTION

1. Field of the Invention

The present invention relates to an apparatus which is equipped with a battery compartment containing a battery and is supplied with electric power from the battery.

2. Description of the Related Art

Conventionally, primary or secondary batteries for small equipment are used widely for optical equipment such as cameras and video cameras; communications equipment such as portable phones and cordless phones; OA equipment such as notebook personal computers and electronic organizers; audio equipment such as headphone stereos, portable CD players, and cassette tape recorders; motor-driven equipment such as electric shavers and electric toothbrushes; toys; flashlight; etc.

Recent advances in portable equipment are remarkable, in which a significant role has been played by performance improvements of small batteries, especially development and improvements of small secondary batteries with high energy density such as nickel-cadmium, nickel hydrogen, and lithium ion batteries.

Voltage characteristics and discharge capacities which are important factors in evaluating battery performance will vary with the voltage and load used. In the case of small batteries, for example, when discharged continuously at a large current of nearly 1 A, secondary batteries such as nickel-cadmium, nickel hydrogen, and lithium ion batteries are capable of discharging stably at nearly their rated capacity, but alkaline manganese batteries can deliver only approximately 40 to 50% of their rated capacity and recover their capacity if they stop discharging for a while. On the other hand, when discharged continuously at a small current of nearly 0.1 A, even alkaline manganese batteries can deliver nearly their rated capacity and can discharge continuously for more than approximately 2.5 times longer than nickel hydrogen batteries and the like. Thus, still cameras, which are used for a shorter period each time and often left unused for longer periods than OA equipment or communications equipment, still have a high need for alkaline manganese batteries.

However, whereas the cylindrical nickel-cadmium battery, for example, has a structure in which a positive plate and negative plate separated by a separator and wound spirally are put in a battery case, the alkaline manganese battery has a structure in which a gelled negative electrode made of zinc powder and an electrolytic solution and positive electrode material made of manganese dioxide and graphite are separated by a separator and put in a steel container which combines a collector. Consequently, the contact resistance between the steel container and the positive electrode material increases with time, resulting in changes in battery characteristics.

One technique for dealing with this problem increases the surface roughness of the battery container to prevent changes in battery characteristics, i.e., the increases in contact resistance caused by nonuniform contact between a container surface and the active material, which results when the positive electrode material which is an active material expands after the battery is assembled (Patent Document 1).

It is believed that this technique can prevent expansion of the active material in the battery from causing changes in battery characteristics due to increase in contact resistance.

[Patent Document 1]

Japanese Patent Laid-Open No. 2000-21359 (Paragraphs 0013 to 0016 and FIGS. 3 to 5)

However, apparent variations in battery characteristics can occur for other reasons, such as an unclean contact point between the positive armature of the apparatus which uses the battery and the positive electrode of the battery, variations in contact resistance caused by a concentrated electric current resulting from reduction in the effective contact area of a contact point, etc.

Thus, the disclosed technique alone cannot completely solve the problem of changes in battery characteristics in alkaline batteries and the like which result in insufficient discharge capacity rating.

FIG. 1 is a diagram showing a typical battery terminal used in a battery compartment of an apparatus.

In FIG. 1, a battery compartment 1 contains a positive armature 2 which is a U-shaped plate spring placed sideways and a negative armature 3 wound spirally. When, for example, an AA battery 5 is put in the battery compartment 1, it is pushed in with the negative side 6 of the AA battery 5 pressing against the negative armature 3 and with an electrode surface 7 of the positive electrode of the AA battery 5 rubbing against a contact point 2a of the positive armature 2. Meanwhile, the electrode surface 7 of the positive electrode is cleaned due to the elastic force of the positive armature 2 and if the AA battery 5 is secured by a surrounding wall 1a of the battery compartment 1 and the elastic forces of the positive armature 2 and negative armature 3, so are the contact positions between the electrodes and battery terminals.

However, the battery compartment has a clearance 1b to allow for battery size variations. Consequently, if the AA battery 5 retreats into the clearance 1b, the electrode surface 7 of the positive electrode of the AA battery 5 will not rub sufficiently against the contact point 2a of the positive armature 2. Thus, the desired cleaning effect cannot be achieved. Also, the AA battery 5 will move around in the battery compartment 1 due to the clearance 1b, causing the contact position between the positive/negative electrode and battery terminal to fluctuate, and thus, resulting in variations in contact resistance.

In view of the above circumstances, the present invention has an object to provide battery-operated portable apparatus and the like equipped with a battery terminal which ensure sufficient discharge capacity with reduced variations in contact resistance between electrodes of the batteries and electrode armatures of the apparatus.

SUMMARY OF THE INVENTION

To achieve the above object, the present invention provides an apparatus which is equipped with a battery compartment containing a battery and is supplied with electric power from the battery, having:

a battery terminal which comes into contact with an electrode of the battery contained in the battery compartment and draws electric power from the battery, wherein the battery terminal is made of a conductive and elastic plate member bent to make a circuit with both its ends juxtaposed to each other, has contacts which come into contact at both the ends with the battery electrode, and has a pair of claws which are formed at positions closer to the center of the plate member than are both the ends, by cutting and raising part of the plate member, to pinch the battery by deflection of the plate member when the battery presses against the contacts.

In this way, the elastic plate member is bent to make a circuit and the battery is put in the battery compartment with the electrode rubbing against the contacts at both ends of the plate member which deflect when pressed. This has the effect of cleaning the battery electrode. Also, after the battery is placed in the battery compartment, both sides of the battery are secured being pinched by the pair of claws due to deflection of the plate member. This prevents the battery from becoming loose and reduces variations in the contact resistance between battery electrodes and battery terminals.

It is also preferable that the claws are strips produced by cutting and raising part of the plate member and crowned with insulating material.

By crowning the strips constituting the pair of claws with insulating material, it is possible to prevent the battery from discharging even in case of accidental contact with metal and thereby maintain safety.

The claws of the apparatus according to the present invention may pinch the periphery of the battery contained in the battery compartment. It is also preferable that the battery contained in the battery compartment has a protruding electrode and that the claws of the apparatus pinch the protruding electrode of the battery contained in the battery compartment.

As described above, thanks to the cleaning effect of the battery terminal and constraining effect of the pair of claws on the battery contained in the battery compartment, the apparatus according to the present invention can reduce variations in the contact resistance between battery electrodes and battery terminals, make efficient use of the rated battery capacity, and thus extend the service life of the battery.

BRIEF DESCRIPTION OF THE DRAWINGS

Preferred embodiments of the present invention will be described in detail based on the following figures, wherein.

DETAILED DESCRIPTION OF THE PREFERRED EMBODIMENTS

An apparatus according to a first embodiment of the present invention will be described below.

Figure 1:
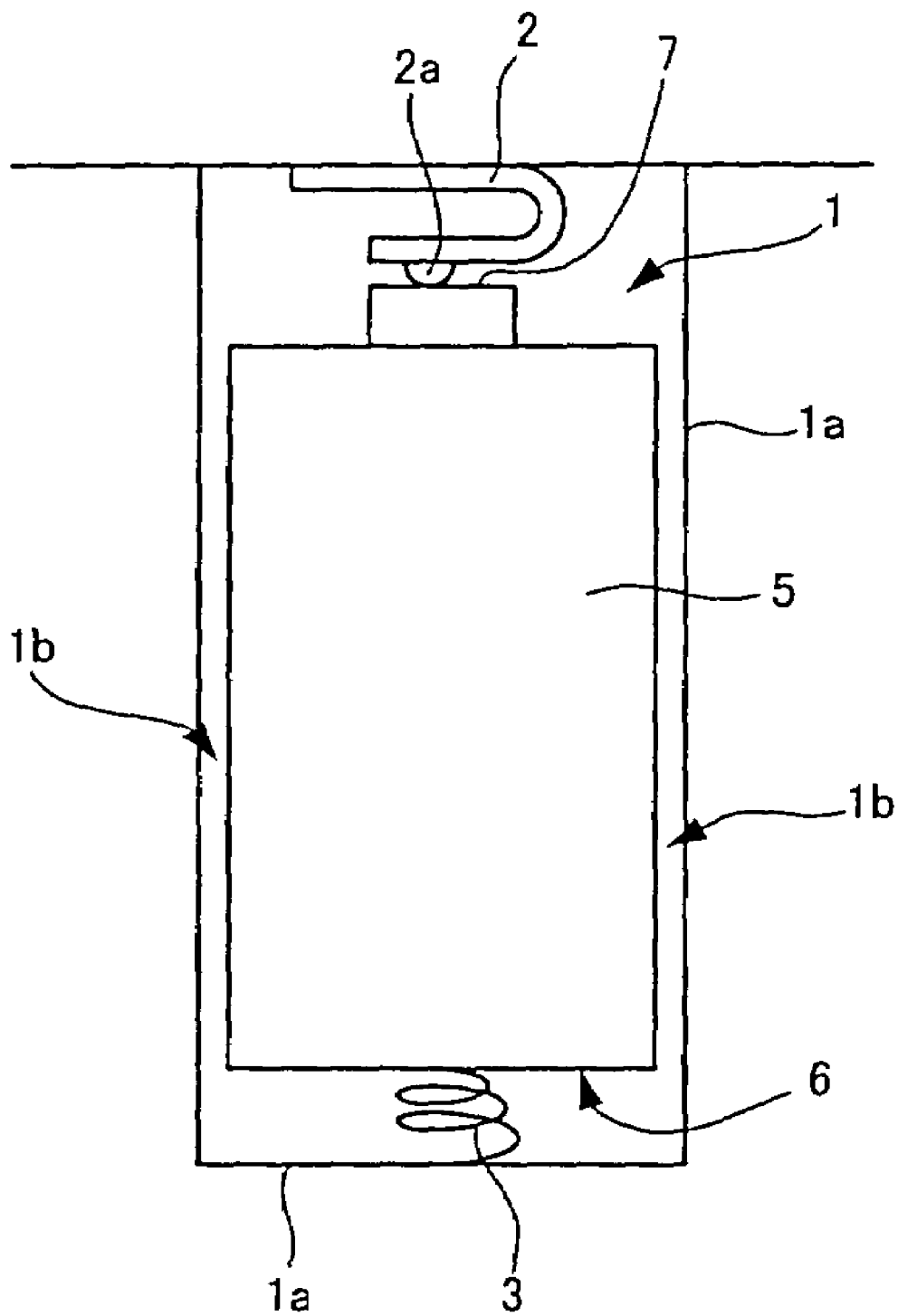
FIG. 1 is a diagram showing a typical battery terminal used in a battery compartment of an apparatus.
Figure 2:
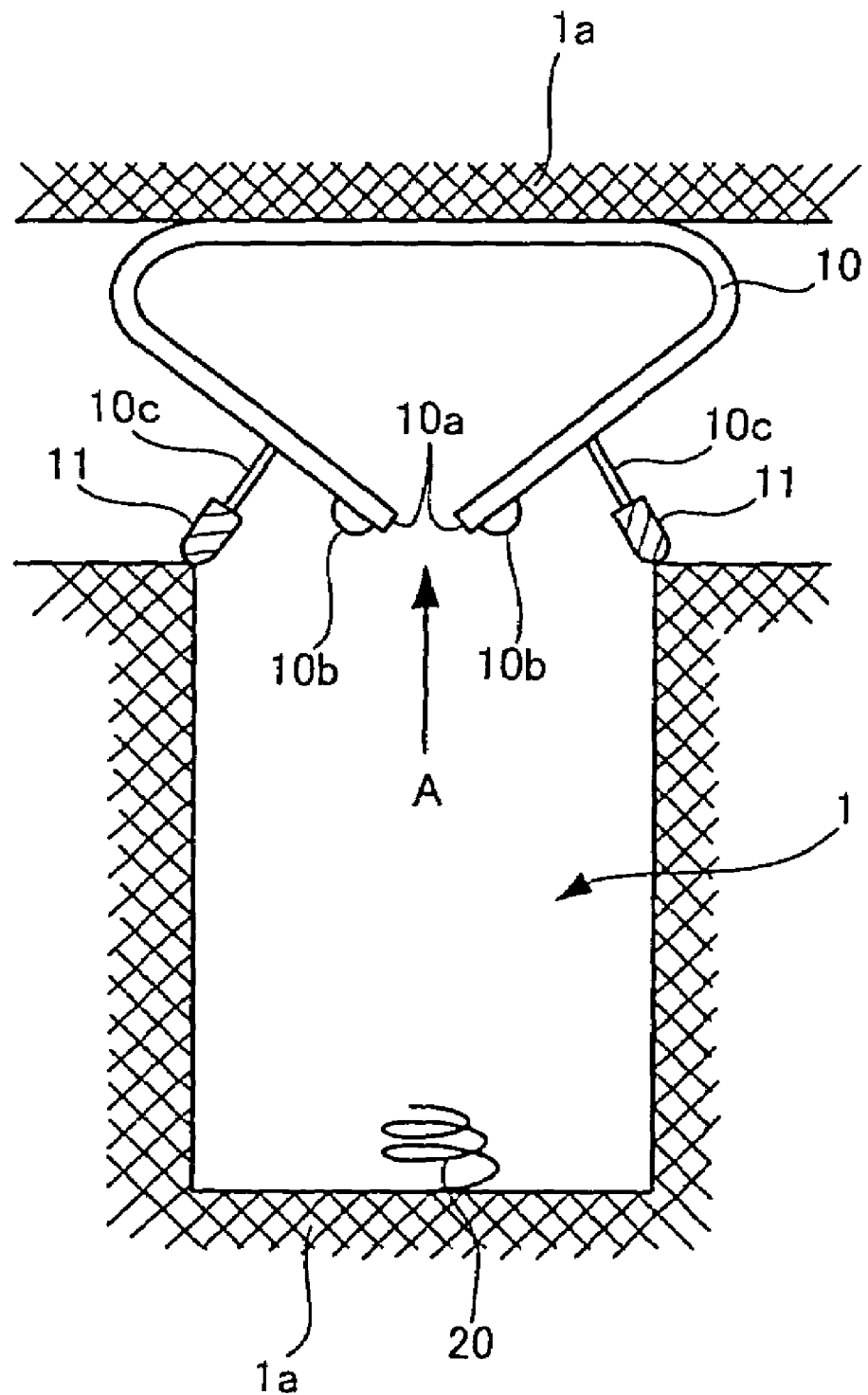
FIG. 2 is a schematic diagram showing a battery terminal installed in a battery compartment of an apparatus according to a first embodiment.
Figure 3:
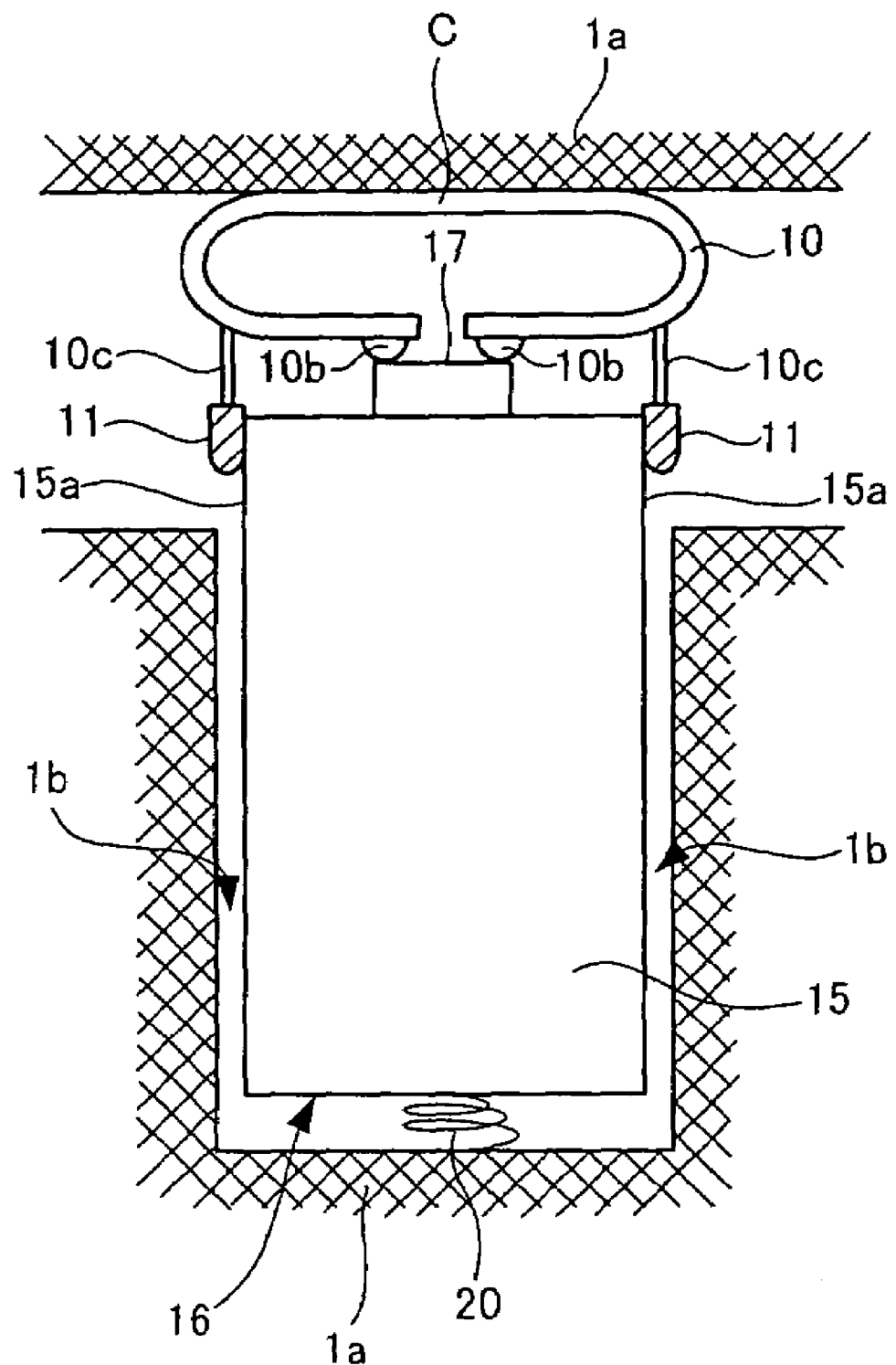
FIG. 3 is a schematic diagram showing a battery terminal installed in the battery compartment of the apparatus according to the first embodiment.

FIGS. 2 and 3 are schematic diagrams showing battery terminals installed in a battery compartment of the apparatus according to the first embodiment.

On one wall surface 1a of a battery compartment 1 in FIG. 2 is a battery terminal 10 which comes into contact with the positive electrode of the battery while on another wall surface 1a is a spring member 20 which comes into contact with the negative electrode of the battery. The battery terminal 10 and spring member 20 are connected to working parts of the apparatus via respective connections (not shown).

The battery terminal 10 is made of a conductive and elastic plate member bent to make a circuit with both its ends 10a juxtaposed to each other, has two contacts 10b which come into contact near both ends 10a with the positive electrode of the battery, and has a pair of claws 10c which are formed at positions closer to the center C of the plate member (FIG. 3) than are both ends 10a. The pair of claws 10c are crowned with insulating material 11.

Although according to the present embodiment, the respective contacts 10b are provided near both ends of the plate member constituting the battery terminal 10, it is not always necessary to provide the contacts 10b, and part of the plate member may be protruded near both ends 10a or part of the plate member may be cut and raised near both ends 10a. Also, although the strips constituting the pair of claws 10c are crowned with the insulating member 11, it is not always necessary to crown them with the insulating member 11.

When a battery 15 is put in the battery compartment 1, first, the spring member 20 on the wall surface 1a of the battery compartment 1 on the negative side 16 of the battery 15 is pressed sufficiently in the direction opposite to the direction of arrow A as shown in FIGS. 2 and 3. Next, as a positive electrode surface 17 of the battery 15 is applied to the contacts 10b of the battery terminal 10, the battery 15 is pressed in the direction of arrow A by the force of the spring member 20 of the battery 15. Consequently, the plate member of the battery terminal 10 deflects and the contacts 10b rub against the positive electrode surface 17 of the battery 15, cleaning the positive electrode surface 17.

Regarding the pair of claws 10c, when the contacts 10b are pressed, the strips crowned with the insulating member 11 pinch a cylindrical container 15a of the battery 15 from both sides, pointing in the direction of the wall surface 1a of the battery compartment 1 on the side of the spring member 20. Then, the battery 15 is secured firmly in the battery compartment 1 by the force of the spring member 20 and the elastic force of the plate member of the battery terminal 10, which are balanced with each other.

In this way, the battery 15 being put in the battery compartment 1 has its positive electrode surface cleaned by the two contacts 10b, and then has both its sides secured after it is put in the battery compartment 1 even if there is a clearance 1b in the chamber. Consequently, the contact positions between the positive electrode of the battery and the contacts 10b are secured as well, reducing variations in the contact resistance between the positive electrode of the battery and contact points. Also, the positive electrode and negative electrode of the battery are brought into intimate contact with the battery terminal 10 and spring member 20 by the elastic force of the battery terminal 10 and force of the spring member 20, respectively, reducing the contact resistance.

Incidentally, according to the present embodiment, the battery terminal is provided only where it contacts the positive electrode of the battery and a spring member 20 is installed on the negative side of the battery, but the location of the battery terminal is not limited to the place where it contacts the positive electrode of the battery and it may be installed on the negative side of the battery.

Figure 4:
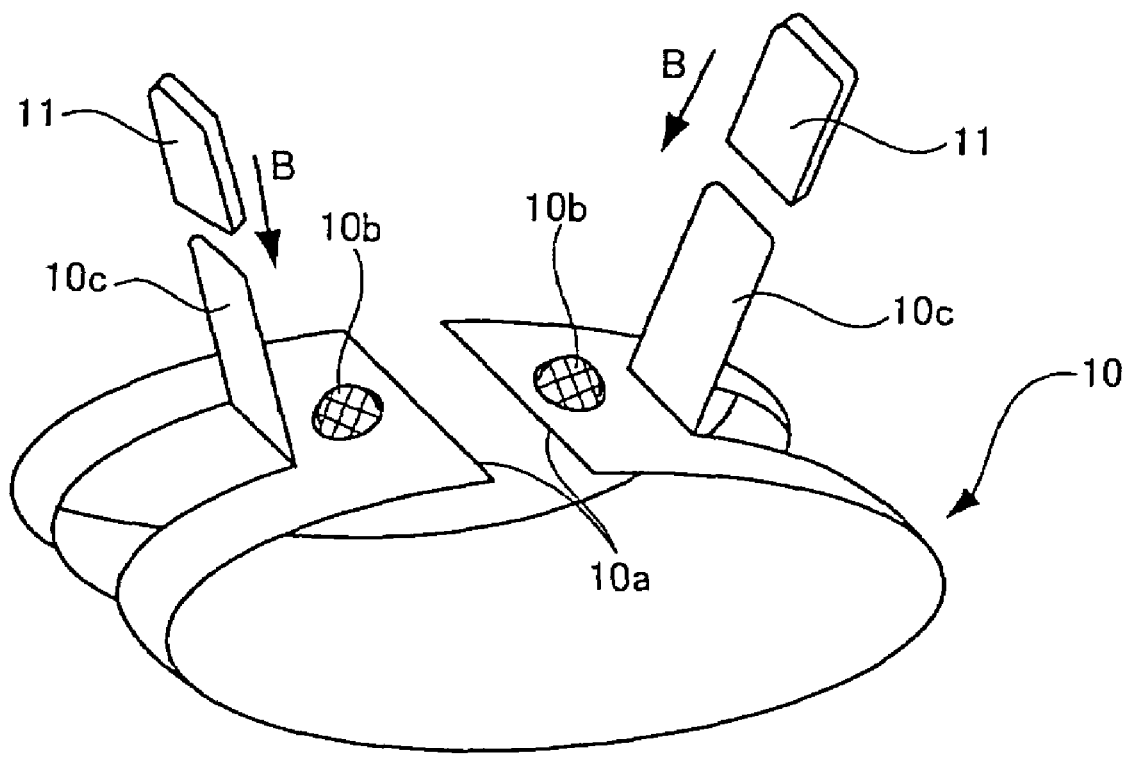
FIG. 4 is a schematic diagram showing the battery terminal of the apparatus according to the first embodiment.

FIG. 4 is a schematic diagram showing the battery terminal of the apparatus according to the first embodiment. The battery terminal 10 shown in FIG. 4 has ends 10a that are made of a conductive and elastic rectangular plate member bent to make a circuit with both its ends 10a juxtaposed to each other to form a ring shape. A pair of claws 10c are formed symmetrically at positions closer to the center of the plate member than are both ends 10a by raising part of the plate member along a rectangular cut. Rectangular insulating members 11 are fitted over the strips of the claws 10c as indicated by arrow B to prevent the battery from discharging even if the claws 10c contact metal or the like and to protect the strips in terms of safety. Also, both ends 10a of the plate member has a contact 10b in contact with the positive electrode of the battery with electric power supplied through the contact.

Although the battery terminal 10 is ring-shaped according to the present embodiment, it does not strictly need to be ring-shaped. All that is required of the plate member bent to make a circuit is to deflect when pressed at both ends 10a by the positive electrode of the battery, so that the pair of claws 10c formed at positions closer to the center of the plate member than are both ends will be energized to pinch the battery and that the pressed battery will be subjected to an elastic force opposite to the direction of pressing. Also, the claws 10c need not necessarily be rectangular, and they can have any shape as long as they can pinch the battery.

Next, an apparatus according to a second embodiment of the present invention will be described below.

Whereas the claws of the battery terminal in the apparatus according to the first embodiment grips the battery container, the claws of the battery terminal in the apparatus according to the second embodiment pinches the positive electrode of the battery, but they are similar in other respects, and only the difference will be described here.

Figure 5:
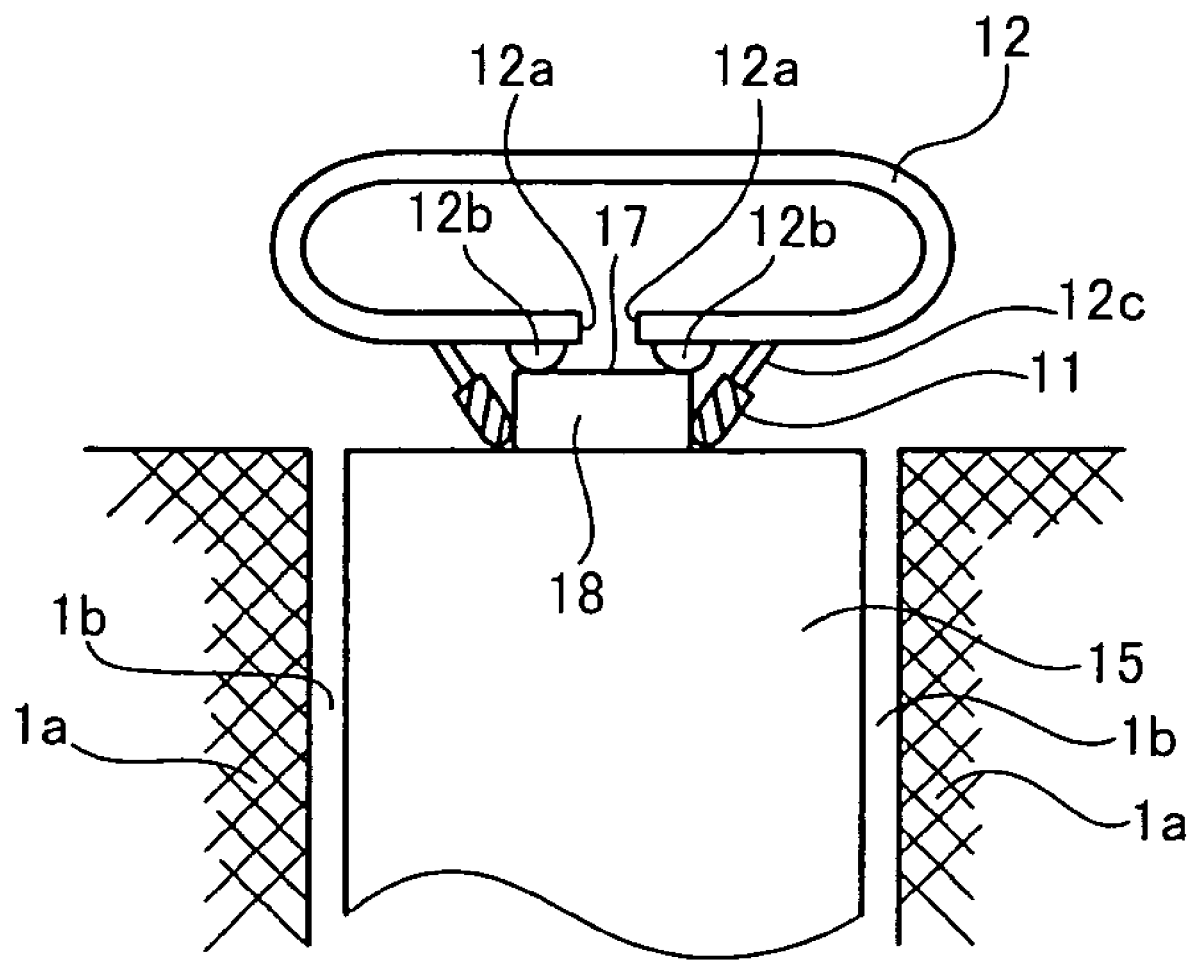
FIG. 5 is a diagram showing how the positive electrode of a battery is pinched by a battery terminal in an apparatus according to a second embodiment.

FIG. 5 is a diagram showing how the positive electrode of the battery is pinched by the battery terminal in the apparatus according to the second embodiment.

The battery terminal 12 shown in FIG. 5 is made of a conductive and elastic rectangular plate member bent to make a circuit with both its ends 12a juxtaposed to each other to form a ring shape. A pair of claws 12c are formed symmetrically at positions closer to the center of the plate member than are both ends 12a by raising part of the plate member along a rectangular cut. Rectangular insulating members 11 are fitted over the strips of the claws 12c. Both ends 12a of the plate member has a contact point 12b in contact with the positive electrode of the battery with electric power supplied through the contact point.

The pair of claws 12c according to the present embodiment are located closer to both ends 12a of the battery terminal 12 and have shorter strips than the pair of claws 10c shown in FIGS. 2 to 4.

Thus, when the contacts 12b are pressed by the positive electrode 18 of the battery 15, the strips capped with the insulating members 11 face inwardly away from the wall surface 1a of the battery compartment 1 and pinch the positive electrode 18 of the cylindrical battery 15 from both sides. Then, the battery 15 is secured firmly in the battery compartment 1 by the force of the spring member 20 and the elastic force of the plate member of the battery terminal 12, which are balanced with each other.

In the present embodiment again, the battery 15 being put in the battery compartment 1 has its positive electrode surface 17 cleaned by the contacts 12b, and then is secured firmly from both sides after it is put in the battery compartment 1 even if there is a clearance 1b in the chamber. Consequently, the contact positions between the positive electrode 18 of the battery and the contacts 12b are secured as well, reducing variations in the contact resistance between the positive electrode 18 and contacts 12b. Also, the positive electrode and negative electrode of the battery are brought into intimate contact with the battery terminal 12 and spring member 20 by the elastic force of the battery terminal 12 and force of the spring member 20, respectively, reducing the contact resistance.

Furthermore, since the pair of claws 12c according to the present embodiment are spaced more narrowly than the pair of claws 10c according to the first embodiment, by using the battery terminal 12 of the present embodiment on the positive side and the battery terminal 10 of the first embodiment on the negative side, it is possible to avoid confusing battery polarity when inserting the battery.

What is claimed is:

1. An apparatus which is equipped with a battery compartment containing a battery and is supplied with electric power from the battery, comprising:

a battery terminal which comes into contact with an electrode of the battery contained in the battery compartment and draws electric power from the battery, wherein the battery terminal is made of a conductive and elastic plate member bent to make a circuit with both its ends juxtaposed to each other, has contacts which come into contact at both the ends with the battery electrode, and has a pair of claws which are formed at positions closer to the center of the plate member than are both the ends, by cutting and raising part of the plate member, to pinch the battery by deflection of the plate member when the battery presses against the contacts.

2. The apparatus according to claim 1, wherein the claws are strips produced by cutting and raising part of the plate member and crowned with insulating material.

3. The apparatus according to claim 1, wherein the claws pinch the periphery of the battery contained in the battery compartment.

4. The apparatus according to claim 1, wherein the battery contained in the battery compartment has a protruding electrode and the claws pinch the protruding electrode of the battery contained in the battery compartment.

* * * * *